United States Patent Office 3,122,518
Patented Feb. 25, 1964

3,122,518
HOMOGENEOUS MIXTURES OF SYNTHETIC
ELASTOMERS AND INORGANIC FILLERS
Heino Logemann and Wolfgang Lehmann, Leverkusen,
Germany, assignors to Farbenfabriken Bayer Aktiengesellschaft, Leverkusen, Germany, a corporation of
Germany
No Drawing. Filed Jan. 5, 1960, Ser. No. 511
Claims priority, application Germany Jan. 9, 1959
3 Claims. (Cl. 260—41.5)

This invention relates to improvements in the production of homogeneous mixtures of synthetic elastomers and inorganic fillers.

It is known from German patent specification No. 878,705 to precipitate aqueous emulsions of synthetic rubberlike polymers in the presence of inorganic hydrated colloids. After the mixtures obtained in this way have been dried and vulcanised, they show an improved notch toughness or tearing strength. However, the distribution of these inorganic colloids in the butadiene polymers is so imperfect that there is strong evolution of heat when rubber mixtures are prepared on rollers. Furthermore, it is necessary to process these mixtures for a comparatively long time on rollers in order to obtain a homogeneous distribution, such as is necessary for obtaining valuable vulcanisates.

It has now been found that by precipitating synthetic elastomers in the presence of inorganic fillers, advantageously silicic acid, an unexpectedly high degree of homogeneity can be produced if an aqueous emulsion of a synthetic elastomer is coagulated in the presence of dispersions of inorganic fillers with water-soluble, polyfunctional, organic, ionic compounds which, in aqueous solutions, have opposite charges to the emulsifiers used for the production of the emulsions, and which are in a position to cancel out the emulsifying action of the emulsifiers being used. The mixtures thus obtained, after being dried, only produce a slight heat evolution during the rolling, they no longer show any dust formation during the mixing process and require practically no additional mixing time in order to bring the rubber into the technically necessary contact with the inorganic fillers.

As synthetic elastomers, there are primarily to be considered those with a base of conjugated diolefines, such as for example butadiene, its homologues and substitution products such as chloroprene, isoprene, dimethylbutadiene, as well as the copolymers of the aforementioned dienes especially of butadiene, isoprene, dimethylbutadien with vinyl compounds, for example, styrene, acrylonitrile, esters of acrylic and methacrylic acid with lower aliphatic saturated monohydric alcohols such as methanol, ethanol, propanol, butanol. These copolymers contain incorporated therein about 50 to 99% of the conjugated aliphatic diolefine with 4 to 6 carbon atoms.

In the production of the emulsions, it is preferred to use anion-active emulsifiers although also cation-active emulsifiers of the dodecylamine type may be applied. Of primary interest for carrying through the process of the present invention are anion-active emulsifiers containing a carboxylic acid group that is to say emulsifier out of the class of the water soluble salts of saturated and monoethylenically unsaturated aliphatic monocarboxylic acids having 8 to 20 carbon atoms such as caprylic, capric, lauric, palmitic, stearic, oleic acid, coconut fatty acid (a mixture comprising about 9% caprylic, 7% capric, 46% lauric, 18% myristic, 9% palmitic, 8% oleic acid), palm kernal fatty acid, furthermore the water soluble salts of naphthene acids and rosin acids such as abietic acid, dehydroabietic acid, dihydroabietic acid, tetrahydroabietic acid and mixtures of said compounds. These carboxylic acids are usually applied in the form of their alkali metal or ammonium salts, preferably sodium and potassium salts.

Further anion-active emulsifiers which may also be used in practising the present invention are the sulfate and sulfonate surface-active agents such as the alkylsulfates (sodium lauryl sulfate, sodium oleyl sulfate), the alkyl sulfonates (dodecyl sodium sulfonate, "Mersolat"), alkylated aryl sulfonates (diisopropyl naphthalene sodium sulfonate, dodecyl benzene sodium sulfonate), sulfosuccinic esters (dioctyl sodium sulfosuccinate) and mixtures of such compounds either with each other or with the above carboxylic anion-active emulsifiers.

The present process furthermore permits the use of all conventional rubber fillers, such for example as lime, chalk, magnesia, calcium silicate, aluminium silicate and advantageously silicic acid.

Suitable for the precipitation of the above emulsions which contain anion-active emulsifiers are basic organic nitrogen compounds which contain at least two primary and/or secondary and/or tertiary amino groups, or their quaternisation products, said nitrogen compounds being water soluble as such or at least in form of their salts with inorganic or organic acids (hydrochloric, sulfuric, formic, acetic, propionic, adipic acid) or of their quaternisation products obtained with alkyl halides (methyl, ethyl chloride) dimethylsulfate, diethylsulfate, p-toluenesulfonic acid ethyl ester or other quaternising agents. For example, it is possible to use the following compounds: Polyalkylenepolyamines as they are obtained in well known manner by reaction of an alkylene dihalide with ammonia, a primary or secondary amine or diamine, such as tetraethylene pentamine, pentaethylenehexamine, hexaethylenheptamine, the peralkylated or partially alkylated derivates thereof, the corresponding propylene derivatives such as tripropylene tetramine as well as mixtures thereof.

Polyimines as they are obtained by the polymerization of ethylene imine or propylene imine.

Polyureas as they are obtained by reacting a diisocyanate such as hexamethylenediisocyanate or a glycol-bischlorocarbonate with a diprimary aliphatic diamine which may contain in its molecule at least one secondary amino group (compare British specification 706,717). These polyureas may be applied in the form of their salts with volatile acids such as acetic acid, hydrochloride acid.

The acid soluble products obtained according to U.S. specification 2,772,248 by reacting an amine containing at least two nitrogen atoms having bonded thereto reactive hydrogen atoms (ethylenediamine, propylenediamine, N-methyl propylenediamine, polyethylene polyamines) with a resinous epoxide having an epoxide equivalent of 225 to 1000.

Water soluble basic condensation products containing free epoxy groups obtained according to U.S. specification 2,849,411 by reacting a di- or polyamine with epichlorhydrin (or dichlorohydrin).

Polyamides from diprimary amines with one or several secondary or tertiary nitrogen atoms in the chain and dicarboxylic acids, polyoxamides from said amines and oxalates (compare British specifications 610,311 and 616,443) or the basic condensation products obtained according to German specification 1,006,155 by reacting an α- or β-halogeno fatty acid, such as chloroacetic acid ethyl ester, with a primary or secondary di- or polyamine.

Polyurethanes from diol with one or several nitrogen atoms such as N-methyldiethanolamine, with a diisocyanate, such as hexamethylene diisocyanate. Polymers containing amino groups obtained by reacting halogen containing polymers with amines, amino groups containing polysaccharides, hydrolysates of protein substances. Such and other suitable basic compounds are for instance disclosed in British specifications Nos. 721,238, 723,767, 729,122, 774,101, 784,946.

The cancellation of the emulsifying action for the present purpose of the joint homogeneous precipitation of synthetic elastomers and inorganic filler can mainly be achieved by using those water-soluble polyvalent organic compounds of opposite charge, which react with an aqueous solution of the emulsifier used during the polymerisation while forming a deposit. For example, triethylene tetramine prepared from ethylene chloride and ammonia is still of too low a molecular weight when using the aforementioned latex-silicic acid mixture, but on the other hand, the higher basic condensation products, such as tetraethylene pentamine, are suitable for a polybutadiene latex prepared with a coconut oil soap and admixed with a silicic acid dispersion, in such a weakly alkali range in which the tetraethylene pentamine form a precipitate in water with the coconut oil soap.

Moreover, for latices which have been prepared with anion-active emulsifiers, there should advantageously be used strong polyvalent bases in the form of their salts or quaternisation products. Polyvinyl pyridine, for example, is usually proved to be too weakly basic. There are primarily to be considered those polyfunctional compounds which contain several aliphatic or hydroaromatic amino groups. In addition, quaternary ammonium compounds prepared therefrom can be used. There are more especially to be considered also the condensation products of epichlorhydrin or dichlorhydrin with aliphatic amines, for example those with at least three amino groups such as diethylene triamine, dipropylene triamine or $\gamma,\gamma'$-diaminodipropyl methyl amine, such as described inter alia in British specification 784,946 and in German specification 944,847. As well as basic groups, these products also contain free epoxy groups in the molecule. However, there can also be employed the condensation products of epichlorhydrin with ammonia, monoamines (such as dimethylamine) or diamines. Condensation products containing quaternary ammonium groupings, such for example as those of epichlorhydrin with tertiary mono- or polyamines, such as trimethylamine, triethylamine, tetramethylethylenediamine, tetraethylethylenediamine have also proved to be very effective. These products are obtained by adding 1 mole of epichlorhydrin at a temperature of about 0 to 50° C. to an aqueous solution of about 1 mole of tertiary amine.

The necessary quantity of the basic compounds is advantageously equivalent to that of the emulsifier present in the rubber latex, but can be greater or less, depending on the stability of the latex, and fluctuates generally in the range between 0.5 and 5% based on solid elastomeric polymer. The quantity to be used increases as the proportion of emulsifier in the latex increases, so that therefore latices with a lowest possible concentration of emulsifier can be worked up in a particularly advantageously manner. The latices usually contain 20–45% by weight of solid elastomer and about 1–10% by weight as calculated on the weight of elastomeric polymer of emulsifier. In the case of coconut fatty acid salt the amount of emulsifier may be as low as 0.5–2% by weight. The silicic acid or the other fillers are preferably applied in amounts of about 30 to 100% by weight as calculated on the weight of elastomeric polymer. It is advisable to coagulate in the weakly alkali or neutral pH range (pH about 6 to 9), since the silicic acid is more or less separated again from the rubber in acid medium, so that a product is formed which is not homogeneous. On the other hand, aftertreatment with acids is possible, if for example there is initially used a latex emulsified with isomerised abietic acid and the precipitate is initially dried. Furthermore, by aftertreatment the moist precipitate with calcium chloride or magnesium sulphate, the resin soaps can be converted into insoluble calcium or magnesium salts.

For the precipitation of a latex which is prepared with a cation-active emulsifier such as a quaternary ammonium salt of dodecylamine, after incorporating the filler dispersion, polyacrylic acid salts are for example suitable.

Each coagulating agent has an optimum value at a predetermined pH value, which depends on the nature of the latex being used and can readily be determined by adding small quantities of acid or caustic solution to the mixture of latex and filler dispersion or to the precipitant solution.

The precipitation can already be made so effective with small amounts of precipitants according to the invention, for example 1 to 5% based on rubber, that it is possible to dispense with an addition of further coagulant, such as for example strong electrolytes. It is one particular advantage of the process that it is possible to dispense with any washing of the precipitate if no additional foreign substances have been introduced into the mixture with the filler suspension. Therefore, this means that the filler dispersion should be washed to such a degree, before being introduced into the latex, that no electrolytes, such as common salt, are present as impurities from the production process. However, an addition of electrolytes, such as for example common salt or ammonium sulphate, frequently permits the precipitation to be such that a satisfactorily clear filtrate is produced and consequently this addition should not in principle be excluded. It will be advantageous to work in such a way that such an additive is not used or only extremely small quantities thereof are used, so that a product is formed which requires little or no subsequent washing. This important processing advantage can more especially be obtained not only by using substantially electrolyte-free suspensions of inorganic fillers, but also by introducing smallest possible quantities of emulsifier during the preparation of the elastomer emulsions. This means that instead of the usual proportion of 6 to 8 parts of emulsifier to 100 parts of polymer, there are only used about 0.5 to 4 parts thereof, that is to say, just the amount which is necessary for forming a sufficiently stable latex. By incorporation of small quantities of ionic groups into the polymer, for example by means of vinyl sulphonic acid, it becomes possible to operate with even smaller quantities of emulsifier. The precipitated product is then found to include an insoluble compound of the emulsifier with the basic precipitant.

One preferred form of the process thus consists in substantially avoiding the presence of low-molecular electrolytes and in using smallest possible quantities of emulsifier.

The process according to the invention enables the precipitation and filtration to be carried out in an extremely simple and time-saving manner. As regards their technological properties, such as for example tensile strength, elongation and abrasion, the products which are obtained show important advantages over a mixture which is for example prepared on the roller. Part of the reason for this is the fact that a basic organic component is present in extremely finely divided form in the product.

The parts indicated in the following examples are parts by weight, unless otherwise indicated.

EXAMPLE 1

A butadiene-styrene-cold rubber latex is prepared according to the following specification in a nitrogen atmosphere:

180 parts of water
0.8 part of coconut oil acid, neutralised with normal caustic potash solution
0.5 part of the sodium salt of the condensation product of $\beta$-naphthylene sulphonic acid and formaldehyde
0.3 part of trisodium phosphate
28 parts of styrene
0.36 part of a mixture of tertiary $C_{12}$, $C_{14}$ and $C_{16}$ mercaptans
72 parts of butadiene
0.02 part of ferrous sulphate, dissolved in a solution of 0.2 part of sodium salt of ethylene diamine tetraacetic acid acidified with sulphuric acid 0.16 part of cumene hydroperoxide
0.12 part of formaldehyde sulphoxylate After 25–30 hours, a yield of 60% is obtained at +5° C., whereafter the reaction is stopped with an aqueous solution of 0.25 part of potassium dimethyl dithiocarbamate. As age resister, there are used 1.5 parts of a non-colouring stabiliser, for example bis-(3-cyclohexyl-5-methyl-2-hydroxyphenyl)-methane, in the form of a suspension in a coconut oil soap solution. The Defo value of the raw sheet is 600 (measured according to DIN 5314, Th. Baader, Kautschuk und Gummi 3 (1950), 159 et seq.; Kautschuk 14 (1938), 223).

100 parts of the 20% butadiene-styrene latex are mixed with 67 parts of a 15% aqueous suspension of a silicic-acid-rubber-filler, while stirring with a normal stirrer mechanism. The silicic acid suspension is passed beforehand through a homogeniser for example a turbo-mixer, in order to disperse any lumps or the like which could have remained after the initial stirring with water.

The mixture constitutes a thickly liquid paste, which is readily dispersed in the latex by gentle stirring. If the mixture is left standing for a time, some of the silicic acid slowly forms a sediment.

The indicated latex-silicic acid mixture is precipitated with three parts (based on rubber) of the following products which are applied in the form of 10–20% aqueous solutions.

(a) Polyethylene imine.
(b) A condensation product of dicyandiamide, guanidine and formaldehyde (see German patent specification No. 763,183).
(c) A condensation product of tetramethyl ethylene diamine and 1,4-dichlorobutane (see Example 3 of Austrian patent specification No. 201,027), to which 3 parts of common salt are added.
(d) A condensation product of dicyandiamide, guanidine hydrochloride, ammonium chloride and formaldehyde (see Example 1 of German patent specification No. 895,439), which contains 3 parts of common salt.

In case (a), the precipitation is already produced quite quickly with practically no stirring, is of comparatively finely divided form and of uniform grain size. In the other examples, the precipitate is of larger grain size. In all cases, the mixture is left standing for about 15–30 minutes after the first stirring and is thereafter thoroughly stirred with a normal strong stirrer mechanism, whereby the precipitation proper is usually produced. The pH value of the precipitation ranges is 8 to 9; the precipitants are always used in the form of their water-soluble hydrochloride or acetate.

The resulting precipitates can be easily and quickly filtered without the silicic acid again separating out as a constituent. The precipitates can also be subsequently washed to a small extent, but this can generally be dispensed with, since with the proportions as indicated, the technological rubber test yields satisfactory values, which are substantially more favourable, especially as regards tensile strengths and abrasion resistance, than when the silicic acid is mixed in on the roller. With a solution of tetraethyl ammonium chloride, and also of bases such as triethanolamine, triethylamine, isobutylamine and stearyl amine, no or only a very slight precipitation is obtained in a proportion of 3%, based on rubber, while a somewhat stronger precipitation can be produced with diisobutylamine, and an almost complete precipitation which is however difficult to work up can be produced with dicyclohexylamine.

EXAMPLE 2

100 parts of the 20% cold rubber latex referred to in Example 1 are mixed with 80 parts of a 12.5% aqueous electrolyte-free silicic acid sol and 1 part of normal caustic soda solution, whereafter there are added 20 parts of a 5% solution of the sulphuric acid salt of the polyurea of $\gamma,\gamma'$-diaminopropyl methylamine and hexamethylene diisocyanate. The mixture is then left to stand for a short time and the coagulation is completed by thorough stirring. A precipitate is obtained which is of good coarse grain and can be easily filtered, and no silicic acid separates out from the said precipitate.

EXAMPLE 3

A butadiene-styrene-cold rubber latex is used, which is prepared by the same specification as that given in Example 1.

100 parts of the 20% latex are mixed while stirring with 67 parts of a 15% aqueous suspension of a silicic acid filler, which has been freed from lumps and the like in a homogeniser. Thereafter, the following condensation products of epichlorhydrin (obtained according to British specification No. 784,946 and German specification No. 944,847 in aqueous solution at about 0–50° C.) are added while briefly stirring, in an amount of 3%, based on rubber:

(1a) 1 mol of diethylene triamine with 3 mols of epichlorhydrin
(1b) 1 mol of diethylene triamine with 2.5 mols of epichlorhydrin
(2a) 1 mol of dipropylene triamine with 3 mols of epichlorhydrin
(2b) 1 mol of dipropylene triamine with 2.5 mols of epichlorhydrin
(3a) 1 mol of $\gamma,\gamma'$-diaminopropylmethylamine with 1.25 mols of epichlorhydrin
(3b) 1 mol of $\gamma,\gamma'$-diaminopropylmethylamine with 3.3 mols of epichlorhydrin
(3c) 1 mol of $\gamma,\gamma'$-diaminopropylmethylamine with 5 mols of epichlorhydrin
(4) 1 mol of dimethylamine with 1 mol of epichlorhydrin
(5) 1 mol of trimethylamine with 1 mol of epichlorhydrin The basic condensation products are in each case added while briefly stirring as 20–25% aqueous solutions of their hydrochlorides or acetates, which are adjusted to a pH value of 6 to 8. The batch is then left standing for about 15 to 30 minutes and is then vigorously stirred until the precipitation is complete, whereafter filtration takes place. If necessary, the mixture can be slightly diluted beforehand with water. In the mixture (1a), (1b), (2a), (2b) and (3c) the precipitation takes place comparatively slowly, and is very much quicker with (4) and especially (5). After stirring, the coarsest precipitation is produced with (5), and here also, after dilution with water, the liquid above the settling deposit has the best clarity.

EXAMPLE 4

A butadiene-styrene latex in accordance with the specification given in Example 1 corresponding to a Defo value of 1050/36 for the raw sheet, is mixed in the ratio 4:1 with a latex which, apart from the quantity of a mixture of tertiary $C_{12}$, $C_{14}$ and $C_{16}$ mercaptans being raised to 1.0 part, has the same composition (according to a raw sheet Defo value of 55/9). The result is a material corresponding to a Defo value of 800.

4350 parts of this latex mixture, corresponding to 1000 parts of rubber, are stirred with a suspension of 500 parts of silicic acid filler of 92% dry content in 2800 parts of water, the mixture having been treated in a homogeniser, and after adding 43 parts of normal sodium hydroxide solution, is mixed with 1300 parts of 2.5% aqueous solution of the condensation product of 1 part of $\gamma,\gamma'$-diaminopropyl methylamine and 3.3 parts of epichlorhydrin neutralised with sulphuric acid. After 15 minutes, the mixture is vigorously stirred so that the precipitation is complete in a short time. It can be filtered off quickly and easily on a paper or cloth filter and, after vigorous squeezing, is dried without further washing at 60–70° C. in a circulating air drier. The mixture contains theoretically:

- 800 parts of rubber, Defo 1050
- 200 parts of rubber, Defo 55
- 25 parts of age resister
- 14.5 parts of coconut oil acid
- 460 parts of silicic filler
- 32.5 parts of condensation product of $\gamma,\gamma'$-aminodipropylmethylamine and epichlorhydrin 1532 parts with 30.0% $SiO_2$ An ignition residue of 28.9% with practically theoretical yield was found. The dried product has a good crumbly character, is not caked together, does not form dust and can easily be processed on the roller or in a kneader.

The test values of the products are indicated under (a) in Table I, while for comparison purposes, a batch with the same rubber material is set out under (b), but in this case the silicic acid filler was incorporated on the roller.

itate. Whether precipitation is effected with or without the aforesaid emulsifier, some of the silicic acid is again separated out very easily in both cases and the precipitate can only be filtered very unsatisfactorily. The precipitate prepared in the presence of sodium diisobutyl naphthalene sulphonate is consequently discharged through a fine-mesh hair screen of silk fabric and initially dried at 60° C. in a drying chamber. After the material has been initially dried, it is washed with water until free from acid. Instead of a theoretical silicic acid content of 31.9%, there is now only a residue on ignition of 21%. It is not homogeneous and must be rolled for a relatively long time before adding the other constituents of the mixture. The products are tested by two different methods; in one case, the prepared mixture is stored without the vulcanisers for 1 day at room temperature and in a second case for 5 hours at 125° C.

From the data given in the table, it can readily be seen that the precipitates produced with the polyvalent amine yield the desired silicic acid content and also have strength and abrasion values corresponding to those of a carbon black mixture, while the same values in the comparison experiments are clearly less satisfactory.

Table 1

| | Percent $SiO_2$ | Defo value of mixture | Initial Vulcanisation | F/D [1] | DIN abrasion | Hardness | Modulus | Flexo | Elasticity 20°/75° |
|---|---|---|---|---|---|---|---|---|---|
| (a) Precipitation with 3.25% condensation product. | 30 1 day at room temperature | 1,050/30 | 8' | 187/560 | 92 | 60 | 59 | 58 | 43/50 |
| | 5 hours 125° C | 1,000/30 | 8' | 152/450 | 84 | 61 | 78 | 54 | 47/58 |
| (b) Silica filler rolled in | 33 1 day room temperature | 1,275/34 | 20' | 99/505 | 132 | 67 | 41 | 62 | 41/50 |
| | 5 hours 125° C | 2,200/34 | 15' | 133/515 | 120 | 61 | 54 | 60 | 41/50 |
| (c) Precipitation with 4.8% condensation product. | 29.5 1 day room temperature | 1,375/35 | 6.5' | 163/430 | 102 | 68 | 92 | 52 | 41/50 |
| | 5 hours 125° C | 1,450/37 | 8' | 213/455 | 72 | 67 | 116 | 52 | 43/56 |
| (d) HCl precipitation | 21 1 day room temperature | 850/31 | 8.8' | 129/620 | 108 | 54 | 30 | 50 | 48/55 |
| | 5 hours 125° C | 950/32 | 7.8' | 126/600 | 99 | 54 | 39 | 50 | 50/57 |

[1] Tearing strength/breaking elongation.

Under (c), there is indicated a corresponding butadiene-styrene-cold rubber mixture which produced by direct polymerisation the Defo value 850 and was not blended with a soft rubber latex. 3,600 parts of this latex correspond to 740 parts of rubber and are mixed with a suspension of 370 parts of the 92% silicic acid filler in 2080 parts of water (the suspension having been homogenised) and precipitated in the same way as above with 1400 parts of a 2.5% solution of the same condensation product. After identical working up, there is obtained with a theoretical yield a product with the same good processing properties and a residue on ignition of 29.5%. Theoretically, with a batch consisting of

- 740 parts of rubber of Defo 850
- 20 parts of age resister
- 10.5 parts of coconut oil acid
- 340 parts of silicic acid filler
- 35 parts of condensation product of $\gamma,\gamma'$-diaminodipropylmethylamine and epichlorhydrin 1146 parts, a residue on ignition of 29.8%

Under (d) in the table, there are indicated by way of comparison the test values of a mixture with which the butadiene-styrene-cold rubber latex used under (c) was mixed in a quantity of 3600 parts, after adding a solution of 10 parts of sodium diisobutyl naphthalene sulphonate, with 370 parts of 92% silicic acid filler formed into a paste in 2080 parts of water, and precipitated with 175 parts of concentrated hydrochloric acid. The addition of the sodium diisobutyl naphthalene sulphonate is essential, because without this, the mixture of latex and silicic acid coagulates in the form of thick lumps when the hydrochloric acid is added. The precipitate must be freed from the large quantity of hydrochloric acid by very thorough washing, but this can scarcely be carried out in practice on account of the poor form of the precip-

EXAMPLE 5

21,500 parts of a 20.6% butadiene-styrene-cold rubber latex corresponding to Example 1 are mixed with 2,850 parts of a 31.5% styrene-butadiene latex, which has been prepared in accordance with the following specification:

- 200 parts of water
- 1 part of coconut oil acid (as potassium salt)
- 0.50 part of the sodium salt of the condensation product of $\beta$-naphthalene sulphonic acid and formaldehyde
- 0.25 part of potassium persulphate
- 85 parts of styrene
- 15 parts of butadiene
- 0.20 part of a mixture of tertiary $C_{12}$, $C_{14}$ and $C_{16}$ mercaptans An 85% conversion is obtained in 14 hours at 45° C. (nitrogen atmosphere). A mixture of 2,600 parts of a 92% silicic acid filler and 14,700 parts of water, homogenised in a turbo-mixer, are incorporated by stirring into the latex mixture. Precipitation is thereafter effected in accordance with Example 2 with 9,600 parts of a 2.5% solution of the condensation product of 1 part of $\gamma,\gamma'$-di-amino-dipropyl methylamine and 3.3 parts of epichlorhydrin, the said product being neutralised with sulphuric acid. There are obtained 8,400 parts of a product with 27% residue on ignition, whereas theoretically there would be produced from

- 4430 parts of butadiene-styrene-rubber (28 parts styrene)
- 900 parts of butadiene-styrene-rubber (85 parts styrene)
- 2400 parts of silicic acid filler
- 74 parts of coconut oil acid
- 108 parts of age resister
- 240 parts of condensation product 8152 parts, with 29.5% $SiO_2$ For comparison purposes, an identical latex mixture is stirred with the same quantity of silicic acid filler which had previously been formed into a paste with water and homogenised in a turbo-mixer. However, a solution of 76 parts of sodium diisobutyl naphthalene sulphonate in 684 parts of water is now added and precipitation is effected with 1,250 parts of concentrated hydrochloric acid. Here also, in the same way as in Example 4, a thick lumpy precipitate which cannot be washed is obtained if the said emulsifier is not added. 7,600 parts of a product with 24% residue on ignition are obtained. Theoretically, there should be obtained from 4430 parts of butadiene-styrene-rubber (28 parts styrene)
900 parts of butadiene-styrene-rubber (85 parts styrene)
2400 parts of silicic acid filler
74 parts of coconut oil acid
108 parts of age resister 7912 parts, with 30.3% $SiO_2$ For comparison purposes, a mixture of a normal commercial cold rubber, a butadiene-styrene copolymer prepared at 5° C. and a commercially obtainable copolymer of 85 parts of styrene and 15 parts of butadiene are mixed in the corresponding ratio with the same silicic acid filler on a roller. The following test values are obtained:

*Table II*

|  | Defo value of mixture | F/D [1] | Modulus 300% | Hardness | Elasticity | Resistance to needle withdrawal | DIN Abrasion |
|---|---|---|---|---|---|---|---|
| (a) Mixing on the roller | 2,600/31 | 114/315 | 107 | 86 | 32 | 32 | 137 |
| (b) Precipitation with condensation product of epichlorhydrin and amine | 2,200/39 | 180/360 | 148 | 83 | 38 | 45 | 86 |
| (c) Precipitating with HCl | 2,600/38 | 134/350 | 113 | 79 | 42 | 36 | 88 |

[1] Tensile strength/breaking elongation.

EXAMPLE 6

100 parts of the butadiene-styrene-rubber latex referred to in Example 1 are mixed with 93 parts of a 10.75% aqueous paste of a silicic acid filler, such as is formed from water glass and hydrochloric acid. The common salt forming during the precipitation of the silicic acid was washed out but the filler was still not dried. Added to the mixture are 3% (based on the rubber content), of an aqueous neutral solution of the condensation product of 1 mol of trimethylamine and 1 mol of epichlorhydrin. A thinly liquid paste is obtained, which is vigorously stirred after standing for 15–30 minutes. After dilution with the same quantity of water, a uniform finely distributed precipitate is obtained, which can easily and quickly be filtered on paper or cloth filters and can also be washed out.

As regards the proportion of emulsifiers and basic precipitants it is preferred to use about 1–10 especially 1–3 parts of precipitant per 1 part of emulsifier.

What is claimed is:

1. A process for preparing a uniform mixture of a conjugated diene polymer and a silicic acid filler which process comprises adding an aqueous dispersion of silicic acid which is substantially free from electrolytes to a latex of a synthetic rubber polymer selected from the group consisting of homopolymers of conjugated aliphatic diolefins and copolymers of said diolefins with monovinyl monomers, said latex containing as an anionic-active emulsifier at most 4% by weight, based on the polymer, of a water-soluble alkaline salt of a monocarboxylic acid having 8–20 carbon atoms, and then adding thereto 1–5% by weight, based on the polymer, of an aqueous solution of a salt of an acid with an organic nitrogen compound selected from the group consisting of a polyethylenimine, a quaternary ammonium compound having at least 2 nitrogen atoms, a primary polyamine, a secondary polyamine, and a tertiary polyamine, said polyamine having at least 5 nitrogen atoms, and thereby coprecipitating the polymer and silicic acid filler.

2. Process of claim 1 wherein said salt of an acid with an organic nitrogen compound is the hydrochloride of the condensation product of 1 mol of $\gamma,\gamma'$-diaminopropylmethylamine and 5 mols of epichlorhydrin.

3. Process of claim 1 wherein said salt of an acid with an organic nitrogen compound is the hydrochloride of the quaternary ammonium compound resulting from the condensation reaction of 1 mol of trimethylamine and 1 mol of epichlorhydrin.

References Cited in the file of this patent

UNITED STATES PATENTS

| 2,359,698 | Uhlig | Oct. 3, 1944 |
| 2,576,909 | Adams | Dec. 4, 1951 |
| 2,616,860 | Leukhardt | Nov. 4, 1952 |
| 2,739,136 | Kharasch et al. | Mar. 20, 1956 |
| 2,885,456 | Ogilby | May 5, 1959 |
| 3,015,642 | Baw et al. | Jan. 2, 1962 |

OTHER REFERENCES

Noble Latex in Industry, 2nd edition, Rubber Age (N.Y.), 1953, page 352.